(12) United States Patent
Van Pelt et al.

(10) Patent No.: US 8,626,545 B2
(45) Date of Patent: Jan. 7, 2014

(54) PREDICTING FUTURE PERFORMANCE OF MULTIPLE WORKERS ON CROWDSOURCING TASKS AND SELECTING REPEATED CROWDSOURCING WORKERS

(75) Inventors: Christopher R. Van Pelt, San Francisco, CA (US); Ryan Cox, San Franciscio, CA (US); Alex Sorokin, San Franciscio, CA (US); Michael Juster, San Franciscio, CA (US)

(73) Assignee: CrowdFlower, Inc., San Francisco, CA (US)

( * ) Notice: Subject to any disclaimer, the term of this patent is extended or adjusted under 35 U.S.C. 154(b) by 0 days.

(21) Appl. No.: 13/275,284

(22) Filed: Oct. 17, 2011

(65) Prior Publication Data

US 2013/0096968 A1    Apr. 18, 2013

(51) Int. Cl.
*G06Q 10/00* (2012.01)
*G06Q 99/00* (2006.01)

(52) U.S. Cl.
USPC ....... 705/7.13; 705/7.14; 705/7.21; 705/7.39; 705/7.41; 705/7.42; 705/317; 705/319

(58) Field of Classification Search
None
See application file for complete search history.

(56) References Cited

U.S. PATENT DOCUMENTS

| | | | |
|---|---|---|---|
| 6,859,523 B1 * | 2/2005 | Jilk et al. | 379/32.01 |
| 6,938,048 B1 | 8/2005 | Jilk et al. | |
| 7,155,400 B1 * | 12/2006 | Jilk et al. | 705/7.14 |
| 7,197,459 B1 | 3/2007 | Harinarayan et al. | |
| 7,778,865 B1 | 8/2010 | Kane | |
| 7,801,756 B1 | 9/2010 | Harinarayan et al. | |
| 7,885,844 B1 | 2/2011 | Cohen et al. | |
| 7,899,694 B1 | 3/2011 | Marshall et al. | |
| 7,945,470 B1 | 5/2011 | Cohen et al. | |
| 8,099,311 B2 | 1/2012 | La Vecchia et al. | |
| 8,170,897 B1 * | 5/2012 | Cohen et al. | 705/7.13 |
| 8,255,258 B1 * | 8/2012 | Cohen et al. | 705/7.21 |
| 2002/0069079 A1 | 6/2002 | Vega | |

(Continued)

FOREIGN PATENT DOCUMENTS

| | | |
|---|---|---|
| JP | 2003084818 A | 3/2003 |
| JP | 2003265863 A | 9/2003 |

(Continued)

OTHER PUBLICATIONS

Chen, A Crowdsourceable QoE Evaluation Framework for Multimedia Content, Copyright 2009, AMC 978-1-60558-608-3/09/10.*

(Continued)

*Primary Examiner* — Mark Fleischer
*Assistant Examiner* — Octavian Rotaru
(74) *Attorney, Agent, or Firm* — Perkins Coie LLP (57) ABSTRACT

Systems and methods of a job distribution platform for aggregating performance data in a worker profile for workers in performing crowd sourced tasks are disclosed. In one aspect, embodiments of the present disclosure include a method, which may be implemented on a system, of generating and storing performance data when a worker performs one or more tasks distributed online to their respective computing devices by a job distribution platform which crowd sources tasks over a network to remote workers. The tasks can span current jobs and a history of previous jobs distributed to the worker and the job performance data for the worker is collected for current and previous jobs. New jobs can be assigned to a worker selected based on performance data of the worker.

4 Claims, 8 Drawing Sheets

(56) References Cited

U.S. PATENT DOCUMENTS

| | | |
|---|---|---|
| 2003/0050829 A1 | 3/2003 | Dietz et al. |
| 2004/0098447 A1* | 5/2004 | Verbeke et al. ............... 709/201 |
| 2005/0154600 A1 | 7/2005 | Feygenson et al. |
| 2006/0059490 A1 | 3/2006 | Knapp et al. |
| 2007/0124363 A1 | 5/2007 | Lurie et al. |
| 2008/0119134 A1 | 5/2008 | Rao |
| 2008/0133270 A1 | 6/2008 | Michelson et al. |
| 2008/0209431 A1* | 8/2008 | La Vecchia et al. ........... 718/104 |
| 2009/0070412 A1 | 3/2009 | D'Angelo et al. |
| 2009/0210282 A1 | 8/2009 | Elenbaas et al. |
| 2009/0234686 A1 | 9/2009 | Chakra et al. |
| 2010/0017252 A1 | 1/2010 | Chaar et al. |
| 2010/0057518 A1 | 3/2010 | Naveh et al. |
| 2010/0069148 A1 | 3/2010 | Cargill |
| 2010/0250359 A1 | 9/2010 | Gillenson et al. |
| 2010/0317442 A1 | 12/2010 | Thomas |
| 2011/0066556 A1 | 3/2011 | Kadosh |
| 2011/0282793 A1* | 11/2011 | Mercuri et al. ................. 705/80 |
| 2011/0313801 A1 | 12/2011 | Biewald et al. |
| 2011/0313820 A1 | 12/2011 | Biewald et al. |
| 2012/0029978 A1* | 2/2012 | Olding et al. ............... 705/7.42 |
| 2012/0053977 A1 | 3/2012 | Bagheri et al. |
| 2012/0150579 A1 | 6/2012 | de Wit |

FOREIGN PATENT DOCUMENTS

| | | |
|---|---|---|
| JP | 2004192061 A | 7/2004 |
| JP | 2007047926 A | 2/2007 |
| JP | 2007141039 A | 6/2007 |
| JP | 2008017946 A | 1/2008 |
| KR | 20040053864 A | 6/2004 |
| KR | 20060122236 A | 11/2006 |

OTHER PUBLICATIONS

Active Learning for Natural Language PRocessing NAACL, ISBN 978-1-932432-40-4, Onipress Inc, Jun. 5, 2009 http://acl.eldoc.ub.rug.nl/mirror/W/W09/W09-19.pdf#p. 37.*

Biewald et al, Ensuring quality in crowdsourced search relevance evaluation—the effects of training question distribution, SIGIR 10, Jul. 19-23, 2010 http://ir.ischool.utexas.edu/cse2010/materials/leetal.pdf.*

Chen et al, A Crowdsourceable QoE Evaluation Framework for Multimedia Content, ACM Oct. 24, 2009 http://mmnet.iis.sinica.edu.tw/pub/chen09_crowdsourcing.pdf.*

Crowdflower Business Listing Verification, YouTube webpages, Jun. 29, 2011 http://www.youtube.com/watch?v=68qd5e4JTpY.*

Crowdflower, Youtube webpages, uploaded Mar. 30, 2010 http://www.youtube.com/watch?v=U4O8RYtcGc4.*

Dredze Mark, Annotating Named Entities in Twitter Data with Crowdsourcing, Proceedings of the NAACL HLT, pp. 80-88, Jun. 2010 http://ebiquity.umbc.edu/_file_directory_/papers/483.pdf http://dl.acm.org/citation.cfm?id=1866709.*

Ipeirotis et al, Quality Management on Amazon Mechanical Turk, ACM 978-1-4503-0222-7, Jul. 25, 2010 http://dl.acm.org/citation.cfm?id=1837906.*

Kern et al, Statistical Quality Control for Human-Based Electronic Services, ICSOC 2010, LNCS 6470, pp. 243-257, Springer 2010 http://link.springer.com/content/pdf/10.1007%2F978-3-642-17358-5_17.pdf.*

Kazai Gabriella, An Exploration of the Influence that Task Parameters have on the Performance of Crowds, Microsoft 2010 http://www.crowdconf2010.com/images/finalpapers/kazai.pdf.*

Laughlin et al, Programmatic Gold—Targeted and Scalable Quality Assurance in Crowdsourcing, AAAI Workshop 2011 https://www.google.com/url?sa=t&rct=j&q=&esrc=s&frm=1&source=web&cd=1&ved=0CD4QFjAA&url=https%3A%2F%2Fwww.aaai.org%2Focs%2Findex.php%2FWS%2FAAAIW11%2Fpaper%2Fdownload%2F3995%2F4267&ei=qiDfUdqTGMeO7QaZyoCoBg&usg=AFQjCNGXYz-C1nBAyVn62X_BZ.*

Smucker et al, The Crowd vs the Lab—A comparison of crowdsourced and University Laboratory Participant Behavior, SIGIR 2011 http://mpss.csce.uark.edu/smsdb/IPSN/The%20Crowd%20vs.%20the%20Lab:%20A%20Comparison%20of%20Crowd-Sourced.pdf.*

U.S. Appl. No. 12/817,946, filed Jun. 17, 2010, Distributing a Task to Multiple Workers over a Network for Completion while Providing Quality Control.

U.S. Appl. No. 12/817,979, filed Jun. 17, 2010, Using Virtual Currency to Compensate Workers in a Crowdsourced Task.

U.S. Appl. No. 61/466,540, filed Mar. 23, 2011, Feedback System and Method for Quality Control and Cost Management in Crowdsourcing.

U.S. Appl. No. 61/502,815, filed Jun. 29, 2011, Programmatic Gold Targeted and Scalable Quality Assurance in Crowdsourcing.

U.S. Appl. No. 61/503,483, filed Jun. 30, 2011, Programmatic Gold Targeted and Scalable Quality Assurance in Crowdsourcing.

U.S. Appl. No. 13/275,290, filed Oct. 17, 2011, Evaluating a Worker in Performing Crowd Sourced Tasks and Providing In-Task Training Through Programmatically Generated Test Tasks.

International Search Report and Written Opinion for PCT/US2011/037626; Date of filing of Application: May 24, 2011; Date of Mailing: Jan. 17, 2012; 10 pages.

Hinds, et al., "Structures that Work: Social Structure, Work Structure and Coordination Ease in Geographically Distributed Teams" CSCW'06, Nov. 4-8, 2006, Banff, Alberta, Canada, pp. 343-352.

International Search Report and Written Opinion for PCT/US2011/037625; Date of filing of Application: May 23, 2011; Date of Mailing: Jan. 19, 2012; 10 pages.

Ipeirotis et al., "Quality Management on Amazon Mechanical Turk," 2010 ACM 978-1-4503-0222-7, pp. 64-67.

Florian Alt. et al., "Location-based Crowdsourcing: Extending Crowdsourcing to the Real World," NordiCHI 2010, Oct. 16-20, 2010, Reykjavik, Iceland, 10 pages.

International Search Report and Written Opinion for PCT/US2012/045321; Date of filing of Application: Jul. 2, 2012; Date of Mailing: Jan. 10, 2013; 10 pages.

International Search Report and Written Opinion for PCT/US2012/060659; Date of filing of Application: Oct. 17, 2012; Date of Mailing: Mar. 28, 2013; 12 pages.

Chen et al., "A Crowdsourceable QoE Evaluation Framework for Multimedia Content," MM'09, Oct. 19-24, 2009, Beiging, China, pp. 491-500.

Stross, R., "When the Assembly Line Moves Online," The New York Times.com, Oct. 30, 2010, 4 pages.

Torikka, M., "Crowdsourcing Startup Microtask Gets Gamers to Do Some Real Work," VentureBeat.com, Mar. 22, 2011, 7 pages.

Alonso et al., "Crowdsourcing for Relevance Evaluation," ACM, V42, N2, Dec. 2008, 7 pages.

Dawid et al., Maximum Likelihood Estimation of Observer Error-Rates Using the EM Algorithm, Journal of Royal Statistical Society Series C, V28, N1, 1979, pp. 20-28.

Eckert et al., "Crowdsourcing the Assembly of Concept Hierarchies," ACM 978-1-4503-0085, Jun. 25, 2010, 10 pages.

Merge et al., "Using the Amazon Mechanical Turk for Transcription of Spoken Language," Carnegie Mellon University, Jan. 1, 2010, 5 pages.

Munro, "Crowdsourcing and language studies - the new generation of linguistic data," Los Angeles, Ca, NAACL HLT, Jun. 6, 2010, 6 pages.

Sheng et al., "Get another label-Improving data quality and data mining multiple," noisy labelers KDD 2008, 9 pages.

* cited by examiner

PREDICTING FUTURE PERFORMANCE OF MULTIPLE WORKERS ON CROWDSOURCING TASKS AND SELECTING REPEATED CROWDSOURCING WORKERS

CROSS-REFERENCES TO RELATED APPLICATIONS

This application is related to, and incorporates by reference in their entirety, U.S. application Ser. No. 12/817,946 filed Jun. 17, 2010 and entitled "DISTRIBUTING A TASK TO MULTIPLE WORKERS OVER A NETWORK FOR COMPLETION WHILE PROVIDING QUALITY CONTROL," and U.S. application Ser. No. 12/817,979 filed Jun. 17, 2010 and entitled "USING VIRTUAL CURRENCY TO COMPENSATE WORKERS IN A CROWDSOURCED TASK.".

This application is related to, and incorporates by reference, U.S. application Ser. No. 13/275,290 filed Oct. 17, 2011 and entitled "EVALUATING A WORKER IN PERFORMING CROWD SOURCED TASKS AND PROVIDING IN-TASK TRAINING THROUGH PROGRAMMATICALLY GENERATED TEST TASKS."

TECHNICAL FIELD

The disclosed technology relates generally to outsourcing or crowd sourcing jobs and tasks while providing sophisticated worker performance tracking for quality enhancement and cost effectiveness.

BACKGROUND

Outsourcing mundane tasks and jobs to online labor around the globe has demonstrated potential in assisting entities and individuals complete a large amount of tasks in a time efficient manner. However, given the variability in labor pool, education level, age group, the results of the completed tasks are frequently less than ideal. Although entities could utilize crowd sourcing to have tasks completed in a short amount of time for a reasonable cost, the quality is typically highly variable and frequently unreliable.

Crowd sourcing is a growing industry, and online platforms exist for completion of tasks and microtasks. Labor-on-demand platforms provide APIs for application development and an international payment infrastructure for the deployment and implementation of crowd sourced tasks. Crowd sourcing has become a global phenomenon with a low barrier to entry. Millions of people around the world now participate in a digital and virtual workplace. However, the breadth and diversity among crowd sourcing participants, workers and researchers is immense and poses a challenge to implement adequate quality control mechanisms to account for a wide range of worker behavior: scammers, lazy workers, ethical workers, unethical workers, slow learners, etc. in a resource effective manner.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for providing crowd sourcing services with quality control mechanisms.

Figure 1:
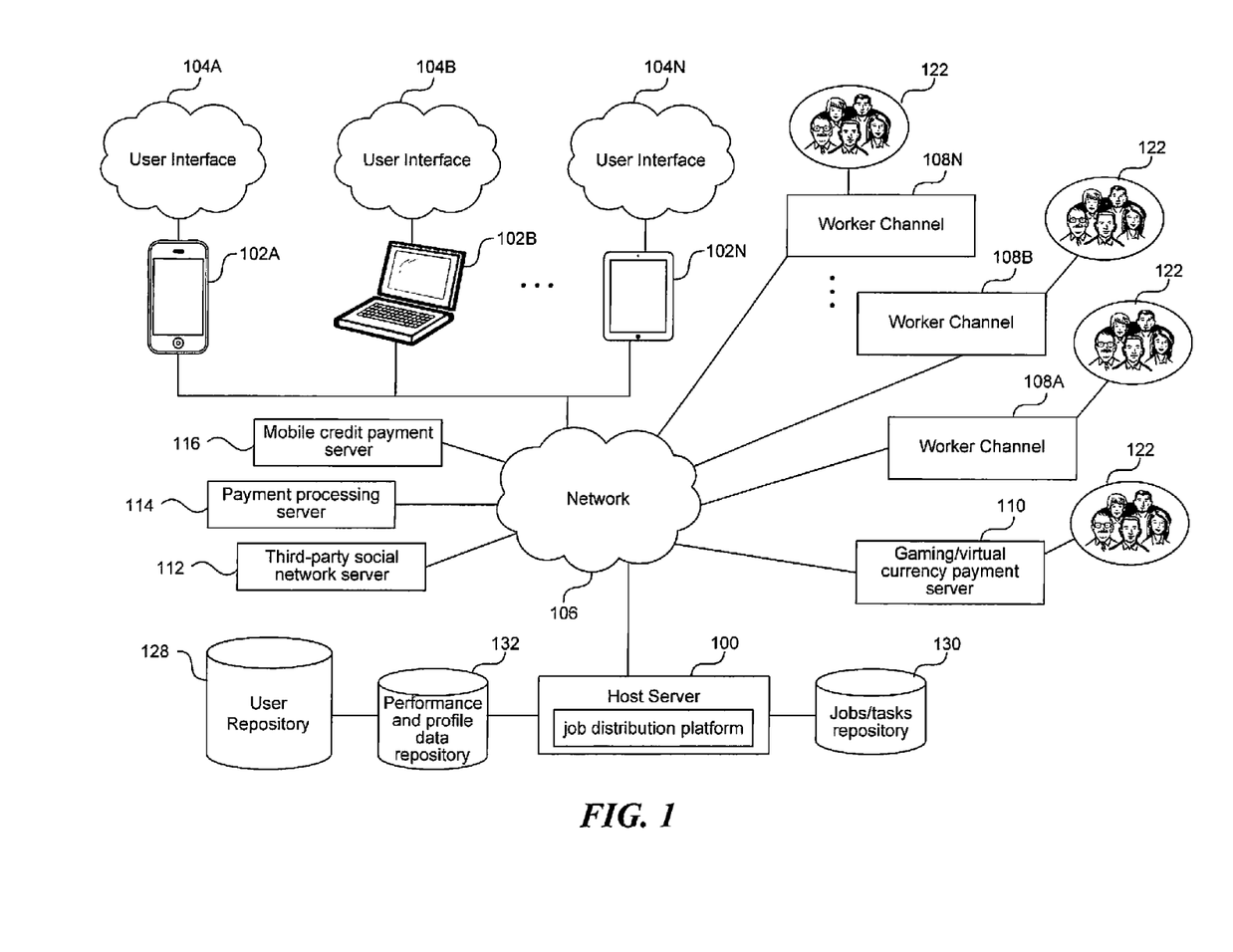
FIG. 1 illustrates an example block diagram of a host server of a job distribution platform that performs crowd sourcing by distributing tasks over a network to multiple workers and aggregates job performance data to generate worker profile data in performing crowd sourced tasks.

FIG. 1 illustrates an example block diagram of a host server 100 of a job distribution platform that performs crowd sourcing by distributing tasks over a network 106 to multiple workers 122 and aggregates job performance data to generate worker profile data in performing crowd sourced tasks.

The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

The client devices 102A-N, worker channels 108, workers (or contributors) 122, gaming server 110, third party social network server 112, payment processing server 114, and/or mobile credit payment server 116, can be coupled to a network 106. In some embodiments, the devices 102A-N and host server 100 may be directly connected to one another.

In one embodiment, the host server 100 is operable to perform crowd sourcing services and/or to process crowd sourcing requests for entities (e.g., companies, organizations or other types of institutions) or users (e.g., individual or groups of users). The host server 100 can distribute a task to be crowd sourced to multiple workers (who may be located through various different channels 108A-N) and provide sophisticated quality control and cost management mechanisms, including tracking worker data over a period of time to provide an indication of worker preference, level of expertise, responsiveness, value of work, performance, speed, and other like performance/quality metrics for the worker or the generated work product.

The host server 100 of the job distribution platform utilizes workers from multiple worker pools via different channels 108. The host server 100 can have a partnering relationship with one or more of the channels 108 Channels can be chosen by demographic requirements such as location and general age/sex of the worker pool. When a contributor completes the work required, the job distribution platform can inform the partner (or channel) that a transaction has completed for a specified amount. The partner can then award the contributor some percentage of the amount in either virtual or real currency. The access to multiple worker pools allows the job distribution platform access to a larger group of workers/contributors and enhances scalability and diversifies worker base. The worker pool which is used for a given job or task can be selected manually by the person posting the task and/or determined in part or in whole by the host server 100. Some pools have limitations, for example, some do not allow adult content, others do not provide the cultural or language needs of the task.

Quality control and the amount of quality desired can be configured by the requesting entity or user such that for example, a user or entity is only charged for the task if completed to the desired or target accuracy level. The channels 110 through which labor can be identified can include by way of example, but not limitation, Amazon Mechanical Turk, Give Work, SamaSource, Trial Pay (e.g., a virtual currency provider), third party social networks (e.g., Facebook, Twitter, LinkedIn, MySpace, third-party social network server 112) or gaming platforms (e.g., Gambit, Prodege, etc.) New and additional labor forces are constantly being integrated into the system and partnering with the host 100, each with their own advantages and disadvantages.

The host server 100, can in addition, also utilize social networks or social network servers (e.g., the 3rd party social network server 112) to aggregate, parse, and/or identify information such as preferences, likes/dislikes, language proficiency, general proficiency, interests, hobbies, expertise related information about workers or contributors which can be used in a worker profile and used as factors in selecting suitable workers for a given job or task.

In some instances, the host server 100 utilizes an online gaming service or platform (e.g., through a third-party gaming server 110 or other partnering platform) through which to distribute tasks or unit jobs and tasks. Gaming services which provide games to various types of online or web-based platforms can also be partnered with the host server 100 of the job distribution platform. Note that the host server 100 may also host gaming services via one or more gaming platforms. The unit jobs can be distributed to garners or other visitors on the gaming platform. In one embodiment, the workers utilized in an online game can be paid in virtual currency, such as virtual currency that can be used to play games on the gaming server 110.

In some instances, the host server 100 utilizes a payment processing server 114 to facilitate payment of workers or contributors 122 in money. The payment processing server 114 can be integrated or operated by the same entity as the host server 100 of the job distribution platform, or it may be operated by a third party. The host server 100 manages the payment preferences of a given worker and ensure, for example, through the payment processing server 114 that the worker gets paid in the desired currency (e.g., U.S. dollars, Euro, etc.), at the desired frequency, in a desired channel (e.g., online, PayPal, direct bank account deposit, physical check, money order), in a desired format (e.g., money, mobile credits, gaming credits, or other types of virtual currency, etc.). For example, the host server 100 can also interact with a mobile credit payment service or mobile credit payment server 116 to facilitate the payment of workers or contributors with mobile credits. The mobile credit payment server 116 may be operated by a wireless network operator or another third party entity. In some instances, the host server 100 internally has mobile credit payment services which operates in whole or in part the payment/compensation of workers in mobile credits.

Figure 2A:
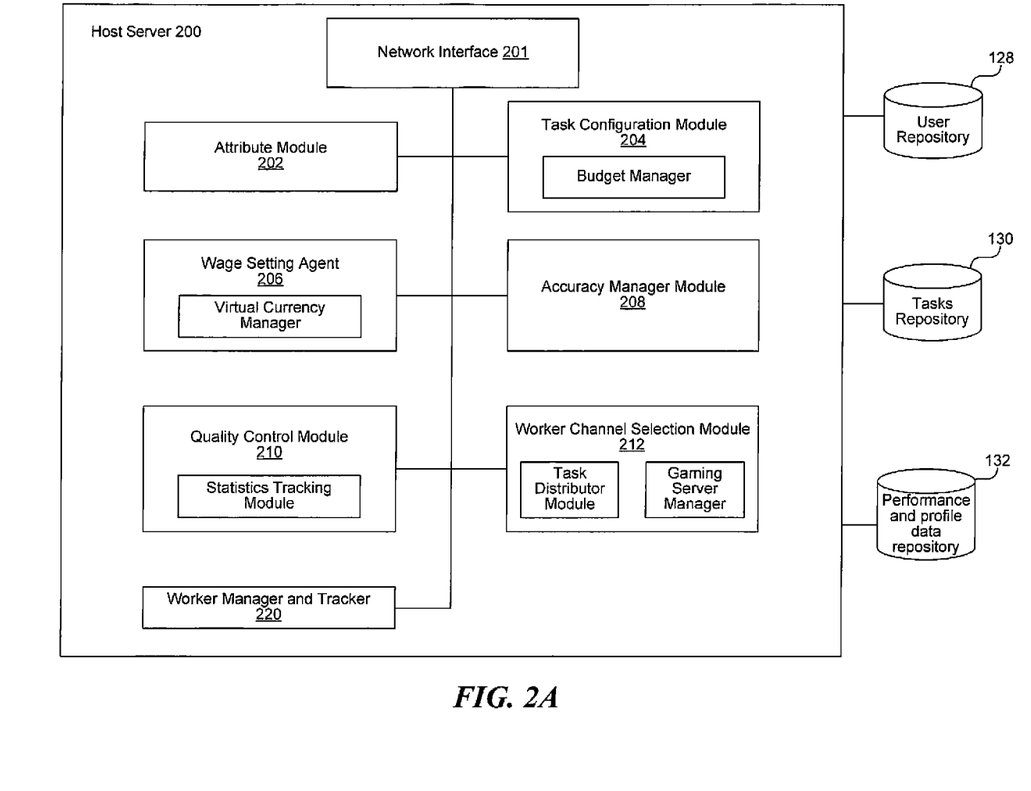
FIG. 2A depicts an example block diagram of the components of a host server of a job distribution platform that distributes (e.g., crowd sources) tasks or microtasks to workers online and providing enhanced quality control through use and aggregation of worker profile data.
Figure 2B:
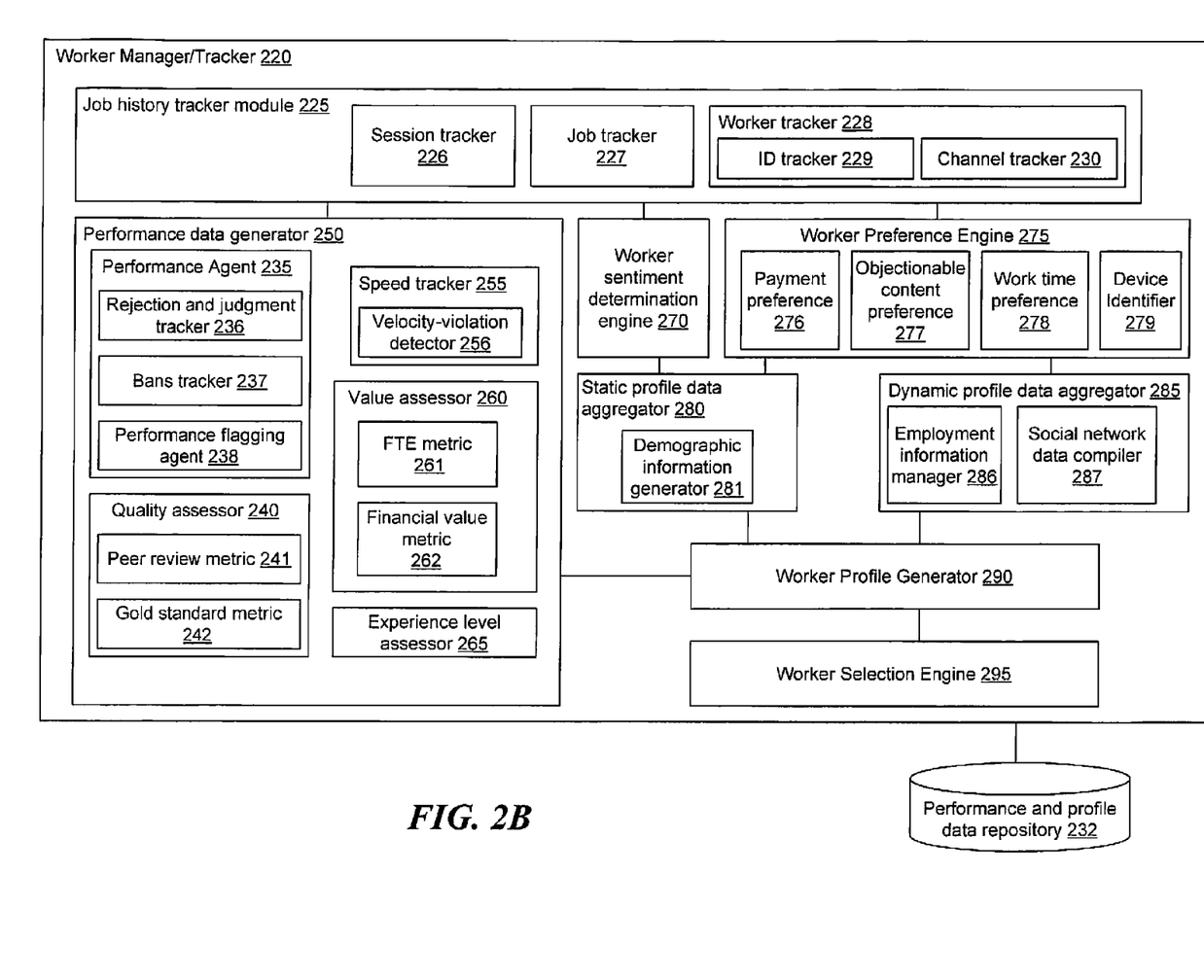
FIG. 2B depicts an example block diagram of the components of a worker manager/tracker module of the host server able to generate and store performance data when a worker performs tasks distributed to them by a job distribution platform which crowd sources tasks over a network to remote workers.

Functions and techniques performed by the host server 100 and the components therein are described in detail with further references to the examples of FIG. 2A-B.

The client devices 102A-N are generally operated by entities/users requesting crowd sourcing services, for example via user interface 104A-N displayed on the display units. The client devices may also be. The client devices 102A-N may also be used (e.g., by programmers and developers) by workers to access job units or tasks for completion.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128 and/or a tasks repository 130. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to provide data to be stored in the user repository 128, the tasks repository 130 and/or can retrieve data stored in the repositories. The user repository 128 can store user (e.g., worker) information, statistics, speed, accuracy, topics of interest, topics of expertise, etc. The tasks repository 130 can include, tasks or unit jobs (e.g., in spreadsheets or other types of files) specified by entities or individuals requesting crowd sourcing services. The repository 130 can also include information about the requesting entities or individuals.

One embodiment further includes a performance and profile data repository 132 which can store enhanced worker (e.g., contributor) performance information and metrics, worker preference information, demographic profile information, social network information, peer review information, etc. Additional details of examples of types of data stored in the repository 132 as illustrated with further reference to the example of FIG. 3.

FIG. 2A depicts an example block diagram of the components of a host server 200 of a job distribution platform that distributes (e.g., crowd sources) tasks or microtasks to workers online and providing enhanced quality control through use and aggregation of worker profile data.

The host server 200 can include, for example, a network interface 201, an attribute module 202, a task configuration module 204 having a budget manager, a wage setting agent 206 having a virtual currency manager, an accuracy manager module 208, a quality control module 210 having a statistics tracking module, a worker channel selection module 212 having a task distributor module and/or a gaming server manager, and/or a worker manager and tracker 220. Additional or less components/modules/engines can be included in the host server 200 and each illustrated component.

The network interface 201 can be a networking module that enables the host server 200 to mediate data in a network with an entity that is external to the host server 200, through any known and/or convenient communications protocol supported by the host and the external entity. The network interface 201 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 200 includes an attribute module 202. The attribute module 202 can be any combination of software agents and/or hardware modules (e.g., including processors and/or memory units) able to identify, detect, extract, an attribute of a task, which generally includes multiple units.

An attribute of a task can include, by way of example but not limitation, level of difficulty of the task, level of subjectivity, etc. Task attributes can be specified or measured by an amount of time that is needed to complete the task. In addition, the attribute can include determining target accuracy specified by the entity or user requesting the crowd sourcing services.

Task attributes can be determined during a calibration process when the requesting entity is setting up jobs or tasks to be distributed to on-demand labor for completion. Timing, wages, and target accuracy can be determined and computed for a unit job or task.

One embodiment of the host server 200 includes a task configuration module 204. The task configuration module 204 can be any combination of software agents and/or hardware modules (e.g., including processors and/or memory units) able to configure a task or unit jobs for quality control and based on a user's specified parameters.

For example, the task configuration module 204 allows the user to upload or edit tasks/unit jobs via a web interface. In addition, the task configuration module 204 calibrates a task by identifying its attributes or attributes of a single unit job. For example, the task configuration module 204 determines the amount of time needed a certain unit job or task requires. This information can be used to determine the wage to pay a worker when they have completed their jobs, for example, by the wage setting agent 206.

One embodiment of the host server 200 includes a wage setting agent 206. The wage setting agent 206 can be any combination of software agents and/or hardware modules (e.g., including processors and/or memory units) able to set a wage amount that is offered to a worker for completing a unit job of the task based on the attribute and the target accuracy.

In general, the wage setting agent 206 can set the wage based on one or more of the attributes, level of target accuracy, the requestor's budget, etc. In addition, the requesting entity/user can specify a desired level of wage to pay each worker. In one embodiment, the system sets the wage dynamically. For example, the initial calibration of the wage can be an estimate and the actual wage is calculated as the job progresses. The system can continue to track the amount of time/resources needed by workers to complete a job. This way, the system can compensate for jobs that are taking workers different amounts of time from what was originally estimated. For example, while most jobs end up around $x/hr, but jobs that are extremely time sensitive can be much higher (e.g., as much as 4-20x/hr). There is also a direct correlation between quality of the work and payment amount. Using the wage amount, the agent 206 can also determine the total cost to the requesting entity to complete the task using the total number of job units in the task. The wage setting agent 206 is configured such that the requestor (entity or user) can tweak the total cost by adjusting, one or more of, the target level of accuracy and the desired/ideal level of wage for paying the workers.

One embodiment of the host server 200 includes an accuracy manager module 208. The accuracy manager module 208 be any combination of software agents and/or hardware modules (e.g., including processors and/or memory units) able to determine, set, identify, the target accuracy in completion of the task by the entity.

The target accuracy can be, for example, specified by the entity/user requesting that a task be distributed to multiple workers (e.g., including online labor, on-demand labor) for completion. The target accuracy can be specified during calibration. The user/entity and indicate whether more or less accuracy is desired. Generally more accurate results require additional results to be obtained per job unit, thus potentially increasing the total cost to complete the task. In some instances, the target accuracy may be set by default rather than user customized.

One embodiment of the host server 200 includes a quality control module 210. The quality control module 210 can be any combination of software agents and/or hardware modules (e.g., including processors and/or memory units) able to implement quality control mechanisms to ensure that the results of the completion of the task are of a quality expected by the requestor.

The quality control module 210 can compute the number of results (e.g., judgments) needed per job unit based on the target accuracy. To compute the number of results, in one embodiment, a minimum number of judgments is initially set. If the measure of agreement is below a predefined percentage once the minimum number of judgments has been collected, more judgments can be collected until the predefined agreement has been met. A maximum number of judgments can also be set, for example to ensure jobs run within budget.

In addition, the quality control module 210 can manage the standards for each task used for quality control. For example, the quality control module 210 enables the requesting entity/user to specify a select set of unit jobs that are presented to online labor units for the entity to evaluate quality of task completion. The questions can be added. In general, the types of tasks that are good for the quality control are those with a right or wrong answer.

For these questions, the correct answers or responses are typically specified. The user/entity can also monitor/track the efficacy of the selected questions. A user can see each selected question and whether workers have correctly answered these questions. The user can also see, access, and/or track how many workers have responded to a selected question. Using the statistics, the user can modify the selection accordingly.

Using these questions, the quality control module 210 can determine the quality of the work and the quality of a particular worker's work product. For example, the quality control module 210 may include a statistics tracking module which tracks, collects and/or aggregates statistics of the online labor units completing the select jobs. In most instances, workers are able to choose any job that has been assigned as long as they meet certain requirements (e.g., age and/or language, etc.). However, workers can also be prohibited from working on a single job, single type of job, or all jobs. For example, workers history, statistics, and performance, can be used to target jobs to workers based on what they have performed well on. Workers are typically allowed to attempt any job they have not been blocked from. If it is the first time they have seen the task they will only be asked known questions. If they have not answered a pre-defined number of questions correctly within a certain time period they are typically not allowed to perform the actual task.

One embodiment of the host server 200 includes a worker selection module 212. The worker selection module 212 can be any combination of software agents and/or hardware modules (e.g., including processors and/or memory units) able to select workers (e.g., online workers, on-demand labor, etc.) to whom to distribute unit jobs of a task.

The worker selection module 212 can select a channel based on the user/entity's selection (e.g., Mechanical Turk, Crowdflower, Gambit (e.g., a third party gaming platform), Give Work, SamaSource, Trial Pay (e.g., a virtual currency provider), Gambit, Internal, etc.). New and additional labor forces are constantly being integrated into the system, each with their own advantages and disadvantages. Based on the selected channel, the task distributor can then distribute jobs to various workers for completion of unit jobs in the task.

In one embodiment, the selected channel is an online gaming environment in which garners or other users are presented with unit jobs while playing games or doing something else. These users can be paid in virtual currency, for example, that they can use in the online gaming environment. Such a process can be performed by the gaming service manager. The gaming server manager can manage games internal to the host server 200 or manage communications with an external gaming server (e.g., the gaming server 110 shown in the example of FIG. 1). The tasks can be presented on a site hosted by the server 200 of presented to workers on the third party site.

In one embodiment, the gaming server manager in the worker channel selection module 212 communicates with the wage setting agent 206 to determine the wage that a worker/gamer would be entitled to upon completion of a unit job or task. The gaming server manager can then determine the amount of virtual currency to which the wage converts. The gaming server manager then communicate the tasks to be presented via the gaming site to the third party gaming server.

One embodiment of the host server 200 includes a worker manager and tracker module 220. The worker channel selection module 212 can be any combination of software agents and/or hardware modules (e.g., including processors and/or memory units) able to detect, track, compute, generate, determine, and/or identify job performance data or job performance-related data for multiple workers/contributors via the job distribution platform. Other types of worker information may also be tracked and generated for multiple workers in various worker pools (channels), for example, psych questions or other more subjective data collected from a worker or contributor in addition to performance.

Worker information including job performance data, can be tracked over a period of time (e.g., historical performance data) for a worker. For example, performance data can be tracked for a given task, a given job (a job can include multiple tasks), a session (e.g., a worker can work on multiple jobs and tasks during a given work session), a day, a week, a month, a year, etc. Useful statistical data can be generated or computed by the manager and tracker module 220 for the job distribution platform to more effectively and efficiently control quality of work product, extract/determine meaningful information about each individual worker/contributor, and/or allow jobs/projects to be more effectively cost managed. By tracking, aggregating, and storing performance data for multiple users across several worker pools, the job distribution platform can have access to useful information for distributing work and managing quality and cost.

Detailed features and functionalities of the worker manager and tracker module 220 are described with reference to FIG. 2B.

The host server 200 represents any one or a portion of the functions described for the modules. The host server 200 can include additional or less modules. More or less functions can be included, in whole or in part, without deviating from the novel art of the disclosure. The repositories 128 and 130 were discussed in conjunction with the description of FIG. 1. The repository 132 is described with further reference to the example of FIG. 3.

FIG. 2B depicts an example block diagram of the components of a worker manager/tracker module 220 of the host server 200 of the example of FIG. 2A able to generate and store performance data for a worker.

The performance data can be determined or generated when a worker performs tasks distributed to them by a job distribution platform (e.g., hosted by the host server 200) which crowd sources tasks over a network to remote workers.

The module 220 can include, for example, a job history tracker module 225 having a session tracker 226, a job tracker 227, a worker tracker 228 having an ID tracker 229 and/or a channel tracker 230. The module 220 can further include a performance data generator 250 having a performance agent 235, a device identifier 245, a quality assessor 240, a speed tracker 255, a value assessor 260, and/or an experience level assessor 265. The performance agent 235 can further include a rejection/judgment tracker 236, a bans tracker 237, and/or a performance flagging agent 238. The quality assessor 240 can include a peer review metric module 241 and/or a gold standard metric module 242. The speed tracker 255 may further include a velocity violation detector 256. The value assessor 260 can include an FTE metric module 261 and/or a financial value metric module 262.

The worker manager/tracker module 220 can further include a worker sentiment determination engine 270, a worker preference engine 275, a static profile data aggregator 280 having a demographic information generator 281, a dynamic profile data aggregator 285, a worker profile generator 290, and/or a worker selection engine 295. The worker preference engine 275 can further include a payment preference handler 276, an objectionable content preference handler 277, and/or a work time preference handler 278. The dynamic profile data aggregator 285 can include an employment information manager 286 and/or a social network data compiler 287.

Additional or less components can be included in the host server 200 and each illustrated component.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the worker manager/tracker 220 includes a job history tracker module 225. The job history tracker module 225 can be any combination of software agents and/or hardware modules (e.g., including processors and/or memory units) able to monitor, track, determine, record, tasks, microtasks, jobs, projects that workers or contributors have worked on through the job distribution platform hosted by server 200. Job attributes, owners, details and the knowledge/expertise involved in each job/task/project can be determined, tracked, recorded for each worker or contributor performing the job and stored (e.g., in repository 132) in association with any quality or performance data for the worker.

The job history tracker module can track and store the jobs performed by workers in a given session (e.g., by the session tracker 226). For example, a worker can perform several jobs in a given work session (e.g., from the time a worker logs in to access work distributed by the job distribution platform to when the user logs out or times out, or stops working for a certain amount of time). A work session can also have a default time period duration (e.g., one day, a certain number of hours, user gets logged out of the system, a few days, etc.) as specified by the worker, job distribution platform, or a given job.

In a given work session, a worker/contributor can work on several projects or jobs, with each project or job having several tasks. The session tracker 226 can track the projects, jobs, and/or tasks that the worker has worked on in a given session and generate or compute statistics (e.g., job performance metrics) for a given project, job, or task in a given session or across multiple sessions. The statuses of the various projects, jobs, and/or tasks performed in a session can also be determined and stored. For example, the session tracker 226 can track one or more tasks that span current jobs and a history of previous jobs distributed to the worker and job performance data for the worker is collected for current and previous jobs.

Similarly, the job history tracker module can track the tasks performed by workers in a given job or across multiple jobs (e.g., by the job tracker module 227). The job tracker 227 can identify, record, and store tasks assigned to and/or performed on, worked on by the workers/contributors. The job tracker module 227 can track a history of previous jobs having tasks a worker has worked on. The statuses of various jobs and/or tasks worked on by workers/contributors can be determined and/or recorded. The worker tracker 228 can track workers that have worked in the sessions, jobs, projects, and on tasks.

In one embodiment, the worker tracker 228 assigns a unique identifier (e.g., using the ID tracker 229) to each unique worker/contributor who has worked on tasks assigned via the job distribution platform. The unique identifier can be used to identify worker profile information and/or worker performance data. The unique identifier can be assigned to the worker to be associated with the worker across various jobs and tasks. The worker manager/tracker 220 can also track a worker based on the worker pool or channel though which the worker is connected to the job distribution platform, for example, by the channel tracker 230. In some instances, a given worker may be a part of multiple worker pools and the unique worker ID can be assigned to a given worker regardless of their multiple worker pool affiliations.

The performance data generator 250 of the worker manager/tracker module 220 can be any combination of software agents and/or hardware modules (e.g., including processors and/or memory units) able to monitor, track, determine, record, job performance data over a period of time for workers/contributors performing work through the job distribution platform that crowd sources tasks to multiple workers.

In general, the job performance data can be collected when the worker performs the tasks distributed online to their respective computing devices by the job distribution platform. In one embodiment, the job performance data includes quantitative metrics which can be determined or computed by the performance agent 235 for various performance and/or quality measures. For example, the rejection and judgment tracker 236 can detect and record results submitted by a worker/contributor that were rejected as faulty or accepted as a correct result (e.g., a judgment). Managing the distribution of tasks can be performed by a task requisition system, for example, using a custom implementation of the in-memory repository or database (e.g., Redis). The repository can be optimized for ensuring redundancy and performing the corresponding de-duplication. For instance, de-duplication can be implemented such that no contributor or worker sees the same task more than a specified number (e.g., once, twice, three times, etc.). If a contributor or worker is rejected, the tasks they had previously completed can be re-routed to other contributors or workers.

In one embodiment, the job performance data includes quantitative metrics indicating a rate or number of instances of bans from the system of flags from assigned jobs, for example, by the bans or flag tracker 237. In general, a 'flagged' worker prevents the workers or contributors from continuing to work on a specific task, or set of tasks. If a worker is banned, it is generally a one time event, and prevents a worker from doing future work through the platform.

A worker/contributor may be banned from performing work through the platform or flagged from performing specific jobs or tasks when the quality or speed of the work does not meet a threshold, which can be set by the job or the job distribution platform. For example, a worker/contributor may be temporarily or permanently suspended from a job if a number of results they provided are inaccurate, or if they submit a certain number of inaccurate results in a certain amount of time, or if the worker does not complete a task within a specified time frame (e.g., by the job poster or the job distribution platform).

In one embodiment, the job performance data includes quantitative metrics indicating a rate or number of instances of the worker has been flagged for performance review but not actually banned from a job or task, for example, by the performance flagging agent 238. Flagging can occur manually or programmatically after certain thresholds have been met. For example, flagging occurs after a peer review system has indicated a contributor is not performing accordingly or showing indicators of poor performance (e.g., spelling mistakes, irrelevant answers, or any other subjective requirements detectable by reviewers). A worker/contributor may be flagged when their performance (e.g., as indicated by one or more performance metrics of quality or speed) falls below a certain threshold, which may be set by a job requestor and/or in part or in whole determined by the job distribution platform. The rate or number of instances when the worker has been flagged for performance review can be used in assessing overall quality/performance of the worker.

In one embodiment, the performance data generator 250 tracks a rate or time with which the worker completes the one or more tasks, for example, via the speed tracker 255. The speed tracker 255 can also determine the speed, rate with which, or amount of time it takes a worker to complete a job, on average over a period of time, over a set of tasks, or over a set of jobs, for example. The rate or time with which the worker completes a task can be used as an indication in a worker profile of how efficient the worker is.

The speed tracker 255 can also track instances when the worker performs or completes a task exceeding a rate or speed, which may be an indication that a worker is not paying attention to performing the assigned tasks. As such, the job performance data can include quantitative metrics indicating a rate or number when the worker has performed or completed one or more tasks exceeding a rate or speed. In addition, the job performance data can include quantitative metrics indicating an average rate or speed with which the worker can satisfactorily complete a task, which can be used as an indicator for efficiency and/or accuracy of the worker. Each or any of the above metrics of job performance can be tracked for workers for a given job, a work session, or a number of tasks.

In one embodiment, the value assessor 260 determines the value, either quantitative or qualitative value, of work generated by workers/contributors. For example, the financial/monetary value of work generated by workers can be determined by module 262 and included as a quantitative metric of job performance data stored for a given worker/contributor. In one embodiment, the quality assessor 240 can determine the accuracy of work generated by the worker using test jobs (e.g., jobs or tasks with known responses/answers). Using test jobs/tasks with known responses/answers, the quality/accuracy of a worker's work product can directly be determined and used in computing a quantitative metric indicating the accuracy of a worker's work product. Quality assessment using test jobs/tasks can be performed by the gold standard metric module 242. In addition, the quality assessment can be performed by the peer review metric module 241, where a worker's work product can be evaluated using results generated by other workers (e.g., determine whether they match or not).

One embodiment of the performance data generator 250 includes an experience level assessor 265 which can determine an experience level of the worker based on duration or tenure with the job distribution platform. The job performance data for workers can thus include quantitative and/or qualitative metrics indicating the experience level of the worker. In addition, experience level can be determined with respect to specific types of jobs/tasks (e.g., business listing verification, content generation, adult-content detection, search result verification, etc.), or with respect to specific disciplines (e.g., art, computer science, math, language, etc.) and indicated in the job performance data of the user profile.

In one embodiment, satisfaction and/or frustration level with the job distribution platform is determined, for example, by the worker sentiment determination engine 270 to be included in the profile data. For instance, quantitative metrics indicating the satisfaction or frustration levels can be included in a worker's profile data.

In one embodiment, the profile data further includes, identification of devices used by the worker to perform tasks distributed by the job distribution platform or a preference of the worker to use one or more devices to work on tasks or specific types of tasks. The devices can be identified by the worker preference engine 275, or the device identifier 245. In general, the worker preference engine 275 can determine, identify, track, record, or store the preferences of the workers. Worker preferences can be explicitly specified by the worker, determined from the worker pool or specific channel through which the worker is accessed, and/or inferred from worker behavior by the job distribution platform. Worker preferences can include an indication of a preferred time of day to perform tasks (e.g., by the work time preference handler 278), indication of willingness to perform tasks involving objectionable content or adult content (e.g., by the objectionable content preference handler 277).

Worker preferences can further include compensation preferences, which can specify preferred wage, preferred currency, and preferred type of currency and/or specify preferred payment mechanism including one or more of, direct deposit, indirect deposit, or mobile credits. Compensation preferences may be determined, tracked, and/or managed by the payment preferences handler 276.

The user profile for workers can also include static profile data created or aggregated by the static profile aggregator 280. For example, demographic profile information (e.g., including, but not limited to, gender, age, ethnicity, religion, education, location, etc.) of workers can be determined, tracked, received, processed, recorded and managed by the demographic information generator 281.

The user profile can also include dynamic profile data which can be collected, aggregated, determined, detected, inferred, tracked, processed, received, stored and/or recorded by the dynamic profile data aggregator 285. For example, employment status information for workers can be determined and tracked by the employment information manager 286. Social profile data and/or professional profile data can also be aggregated for workers, for example from social network services including third party social networks and servers. Dynamical profile elements generated from historical work data can also be used. For example, the aggregator 285 can determine or track workers' historical speed, accuracy, or answer distribution and make this information queryable through the contributor profile. The aggregator 285 can also apply learning algorithms to good signals to predict future performance of a worker.

The worker profile generator 290 can use any combination of or all of the above user data including, but not limited to, quantitative and/or qualitative performance metrics for worker performance quality indicating accuracy, efficiency, knowledge, financial value, and/or expertise, worker preference (explicit or non-explicit), static or dynamic profile data (e.g., demographic information, real-life employment information, social network, presence, location information) to generate a worker profile for the worker.

The worker profile or any of the information contained therein can be used by the worker selection engine 295 in selecting a suitable worker from the repeat workers for a given task. For example, a given worker or workers can be selected to perform the new job based on worker preferences indicating willingness or unwillingness to work on objectionable or controversial content, or other criteria related to experience level, efficiency, or overall quality/accuracy.

Figure 3:
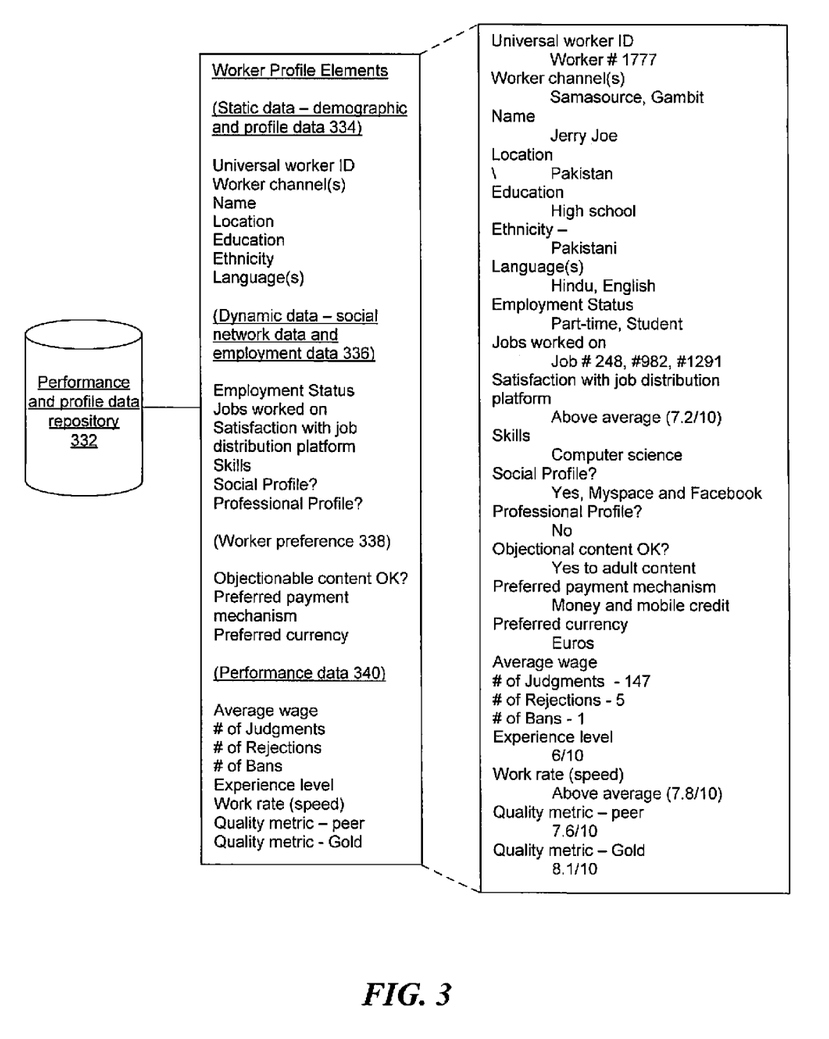
FIG. 3 illustrates an example repository for storing worker/contributor performance and profile data.

FIG. 3 illustrates an example repository 332 for storing worker/contributor performance and profile data.

The performance and profile data can include information aggregated or determined by the worker manager/tracker 220 shown in the example of FIG. 2 and the various components therein. As described in FIG. 2, the worker profile elements can include static data 334, dynamic data 336, worker preference information 338, and/or performance data 340. An example listing of each category of worker profile data is shown. Metrics for performance data can be quantitative (as shown in the example of FIG. 3) or qualitative (e.g., good, bad, average, or assigned a letter grade (P/NP, A, C, D, etc.). Other types of metrics of measure can also be used.

Figure 4:
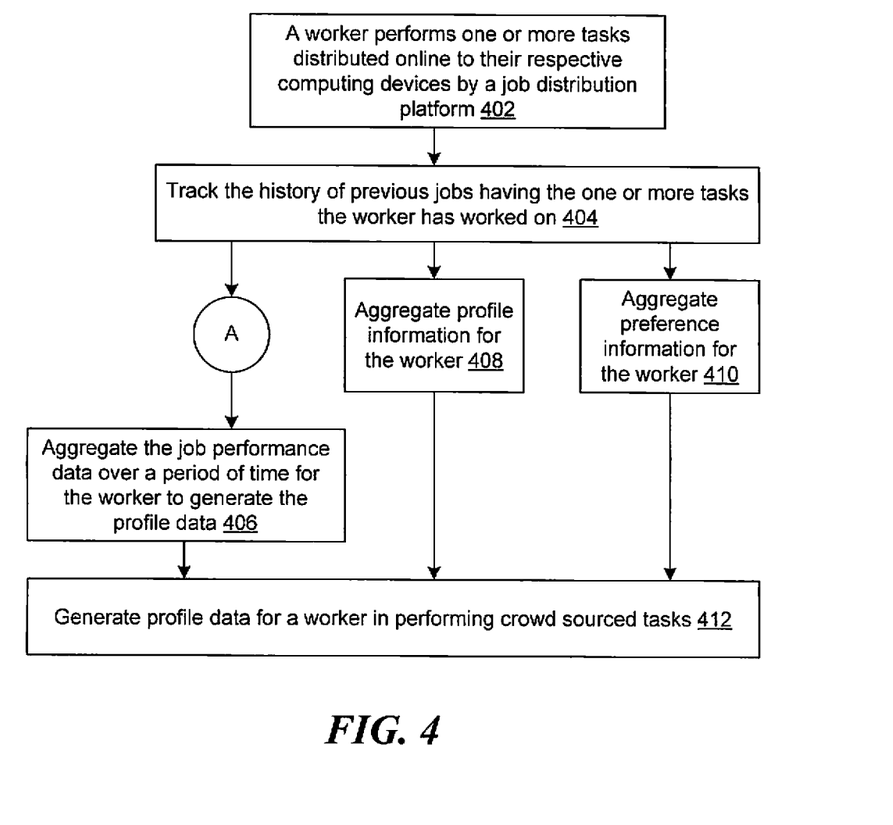
FIG. 4 depicts a flow chart illustrating an example process for generating profile data for a worker or contributor in performing crowd sourced tasks.

FIG. 4 depicts a flow chart illustrating an example process for generating profile data for a worker or contributor in performing crowd sourced tasks.

In process 402, a worker/contributor performs one or more tasks distributed online to their respective computing devices by a job distribution platform. In process 404, a history of previous jobs having the one or more tasks the worker has worked on is tracked. Using the previous jobs and in addition, current jobs, performance metrics are determined in accordance with example steps at Flow A shown in the example of FIG. 5.

In process 406, the job performance data is aggregated over a period of time for the worker to generate the profile data. In addition, profile information for the worker can be aggregated in process 408. Preference information can be aggregated in process 410. In process, 412, profile data for a worker who performs crowd sourced tasks can be generated using any or all of the above worker information.

Figure 5:
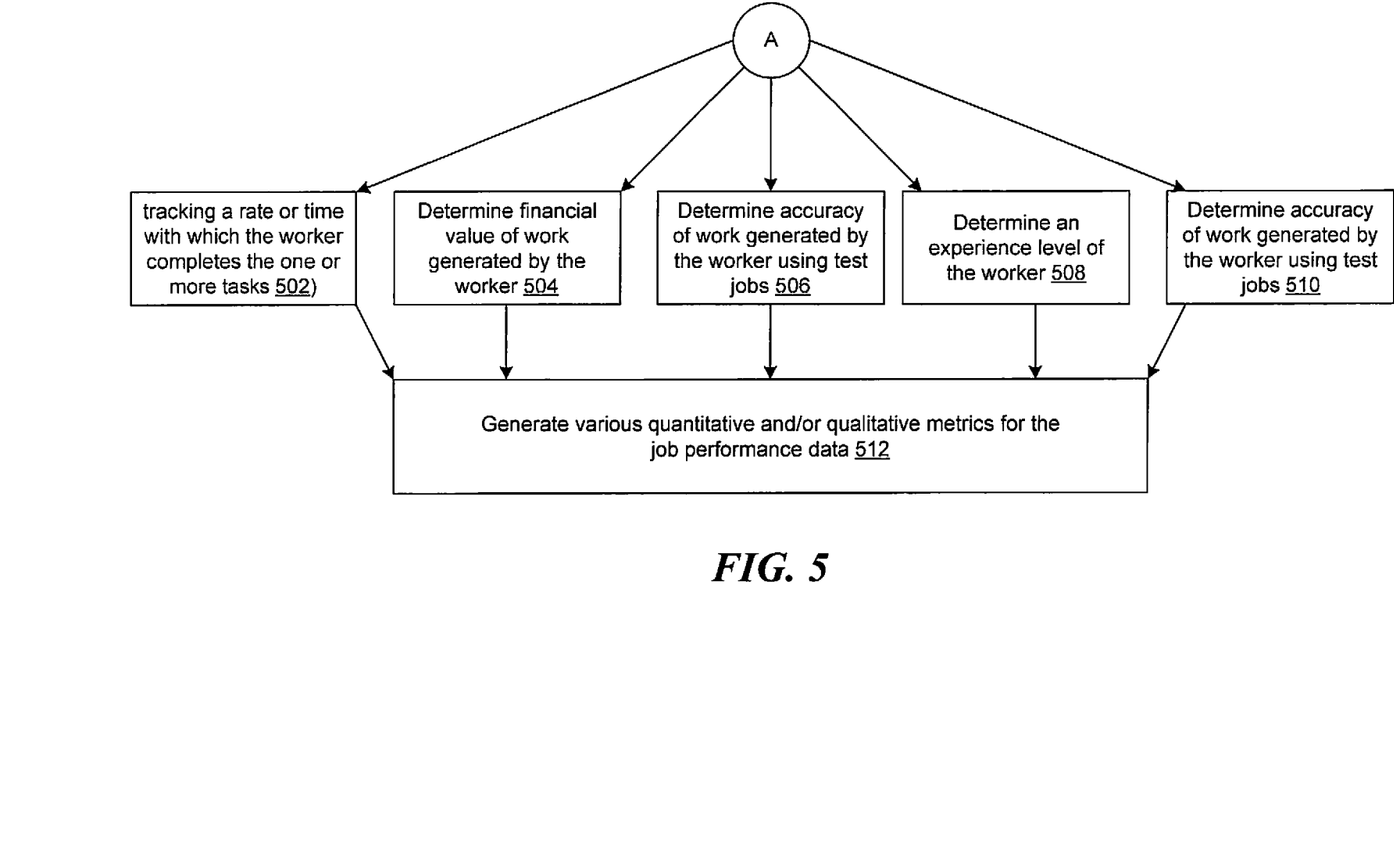
FIG. 5 depicts a flow chart illustrating example processes for generating quantitative metrics to characterize job performance in performing crowd sourced tasks.

FIG. 5 depicts a chart illustrating example processes for generating quantitative metrics to characterize job performance in performing crowd sourced tasks. For example, in step 502 a rate or time with which the worker completes the one or more tasks can be tracked. In step 504, financial value of work generated by the worker can be determined. In process 506, accuracy of work generated by the worker can be determined using test jobs. In process 508, experience level of the worker can be determined. In process 510, accuracy of work generated by the worker using test jobs can be determined. In process 512, various quantitative metrics for the job performance data can be generated using any combination of or all of the above analysis. Qualitative metrics can also be generated and included in the worker profile using the above analysis.

Figure 6:
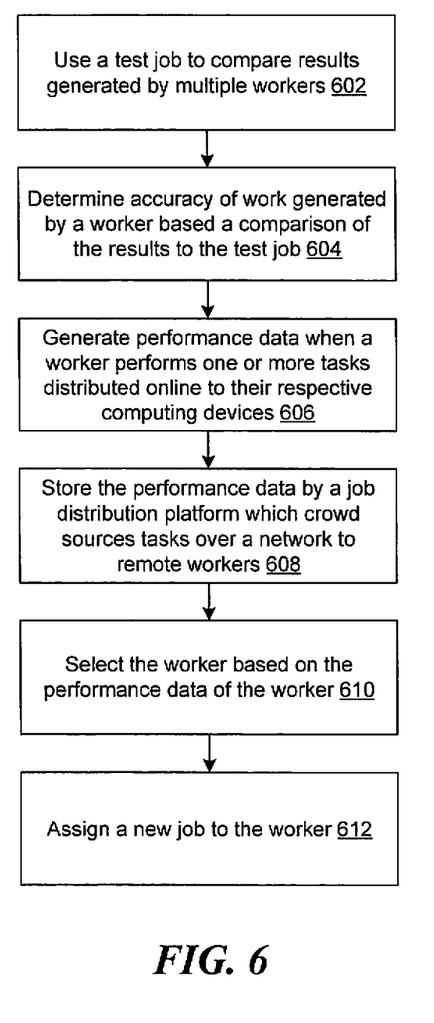
FIG. 6 depicts a flow chart illustrating an example process for using performance data to select a suitable worker to whom to distribute a crowd sourced task.

FIG. 6 depicts a flow chart illustrating an example process for using performance data to select a suitable worker to whom to distribute a crowd sourced task.

In process 602, a test job is used to compare results generated by multiple workers. In process 604, accuracy of work generated by a worker based a comparison of the results to the test job. In process 606, performance data is generated when a worker performs one or more tasks distributed online to their respective computing devices (e.g., using the results of the test job). In process 608, the performance data is stored by the job distribution platform which crowd sources tasks over a network to remote workers. In process 610, a worker can be selected based on the performance data of the worker. In process 612, a new job can be assigned to the selected worker.

Figure 7:
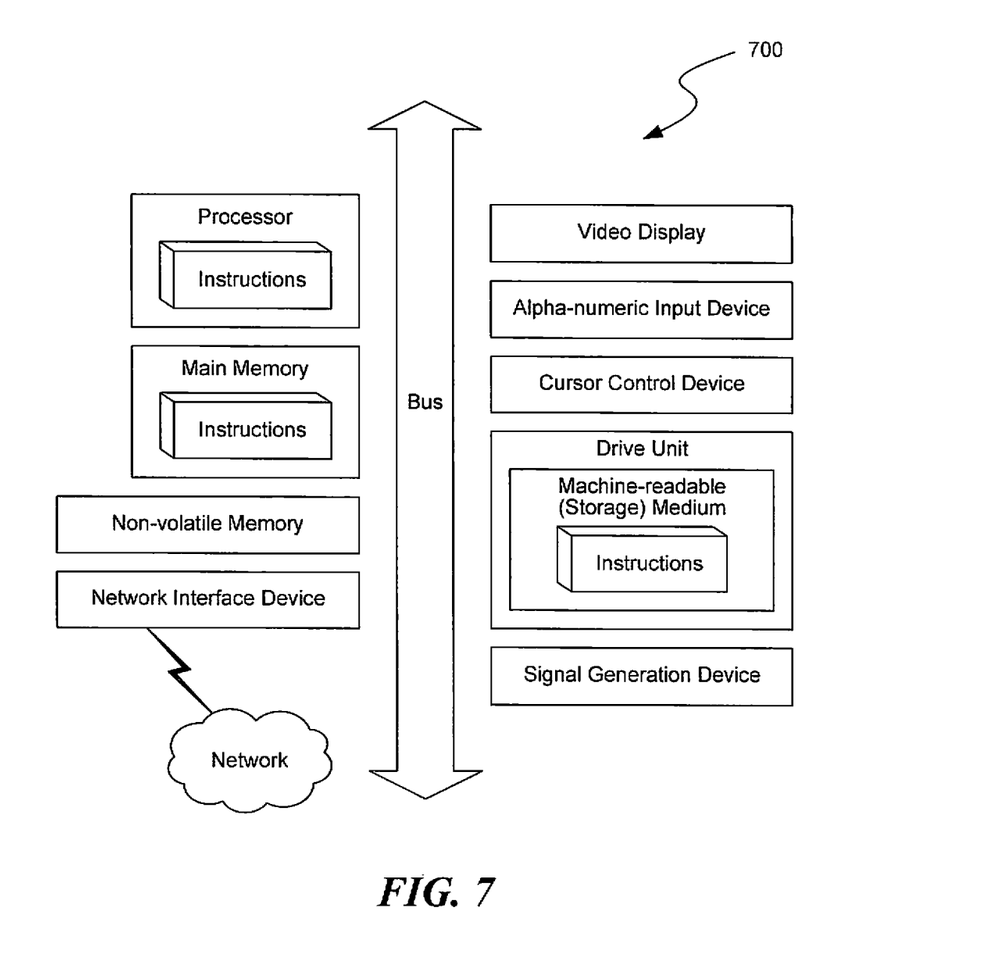
FIG. 7 shows a diagrammatic representation of a machine in the example form of a computer system within which a set of instructions, for causing the machine to perform any one or more of the methodologies discussed herein, may be executed.

FIG. 7 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method, performed by a task distribution server, for predicting future performance of multiple workers on crowdsourcing tasks and for selecting repeated crowdsourcing workers, the method comprising:

monitoring, by the task distribution server, results on crowdsourcing tasks performed by multiple workers;

generating, by the task distribution server, a test task with known responses;

comparing, by the task distribution server, the monitored results generated by the multiple workers to the test task;

monitoring, by the task distribution server, a speed rate at which the multiple workers complete the crowdsourcing tasks;

computing, by the task distribution server, an average speed rate at with which the multiple workers can satisfactorily complete a task;

comparing, by the task distribution server, the monitored speed rate at which the multiple workers complete the crowdsourcing tasks to the average speed rate at with which the multiple workers can satisfactorily complete a task;

determining, by the task distribution server, work accuracy of each of the multiple workers based on comparing the monitored results generated by the multiple workers to the test task, and based on comparing the monitored speed rate at which the multiple workers complete the crowdsourcing tasks to the average speed rate at with which the multiple workers can satisfactorily complete a task;

selecting, by the task distribution server, repeat workers to perform a new task based on the determined work accuracy of each of the by multiple workers;

temporarily or permanently suspending, by the task distribution server, the repeat workers from performing the new task when their work accuracy falls below a threshold;

re-routing, by the task distribution server, the new task from the repeat workers to other workers;

aggregating, by the task distribution server, the performance data for the multiple workers across several worker pools;

predicting, by the task distribution server, future performance of the multiple workers based on the aggregated performance data.

2. The method of claim 1, wherein, the aggregated job performance data is stored, by the task distribution server, for the multiple workers for future use in selecting the repeat worker to perform the a new task.

3. The method of claim 1, wherein the work accuracy of each of the multiple workers is indicated by quantitative metrics.

4. A task distribution server for predicting future performance of multiple workers on crowdsourcing tasks and for selecting repeated crowdsourcing workers, the task distribution server comprising a memory storing instructions that when executed, by one or more computer processors, causes the task distribution server to:

monitor results on crowdsourcing tasks performed by multiple workers;

generate a test task with known responses;

compare the monitored results generated by the multiple workers to the test task;

monitor, a speed rate at which the multiple workers complete the crowdsourcing tasks;

compute, an average speed rate at with which the multiple workers can satisfactorily complete a task;

compare, the monitored speed rate at which the multiple workers complete the crowdsourcing tasks to the average speed rate at with which the multiple workers can satisfactorily complete a task;

determine, work accuracy of each of the multiple workers based on comparing the monitored results generated by the multiple workers to the test task, and based on comparing the monitored speed rate at which the multiple workers complete the crowdsourcing tasks to the average speed rate at with which the multiple workers can satisfactorily complete a task;

select, repeat workers to perform a new task based on the determined work accuracy of each of the by multiple workers;

temporarily or permanently suspend, the repeat workers from performing the new task when their work accuracy falls below a threshold;

re-route the new task from the repeat workers to other workers;

aggregate the performance data for the multiple workers across several worker pools;

predict, future performance of the multiple workers based on the aggregated performance data.

\* \* \* \* \*